(12) United States Patent
Choi et al.

(10) Patent No.: US 12,065,544 B2
(45) Date of Patent: Aug. 20, 2024

(54) CURABLE COMPOSITION AND OPTICAL ELEMENT COMPRISING CURED PRODUCT THEREOF

(71) Applicant: LG CHEM, LTD., Seoul (KR)

(72) Inventors: Hee Jung Choi, Daejeon (KR); Youngsuk Kim, Daejeon (KR); Soonhwa Jung, Daejeon (KR); Yeongrae Chang, Daejeon (KR); Hye Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 664 days.

(21) Appl. No.: 17/291,238

(22) PCT Filed: Nov. 5, 2019

(86) PCT No.: PCT/KR2019/014923
§ 371 (c)(1),
(2) Date: May 4, 2021

(87) PCT Pub. No.: WO2020/101248
PCT Pub. Date: May 22, 2020

(65) Prior Publication Data
US 2021/0355280 A1    Nov. 18, 2021

(30) Foreign Application Priority Data
Nov. 13, 2018   (KR) .......................... 10-2018-0139331

(51) Int. Cl.
*C08G 75/08* (2006.01)
*G02B 1/04* (2006.01)

(52) U.S. Cl.
CPC .............. *C08G 75/08* (2013.01); *G02B 1/04* (2013.01)

(58) Field of Classification Search
CPC ... C08L 81/02; C08L 2201/10; C07D 331/02; C08G 75/08; C08K 3/06; G02B 1/04; G02B 1/041
See application file for complete search history.

(56) References Cited

U.S. PATENT DOCUMENTS

| | | | |
|---|---|---|---|
| 5,241,010 A | 8/1993 | Yokoi | |
| 9,283,185 B2 | 3/2016 | Kurzrock et al. | |
| 2007/0241313 A1* | 10/2007 | Kato | G06Q 40/02 |
| | | | 252/585 |
| 2010/0137555 A1 | 6/2010 | Itoh et al. | |
| 2015/0259477 A1 | 9/2015 | Kariyazono et al. | |
| 2016/0259091 A1* | 9/2016 | Horita | G02B 1/04 |
| 2017/0015776 A1 | 1/2017 | Tsukada et al. | |
| 2017/0015777 A1 | 1/2017 | Tsukada et al. | |
| 2018/0127549 A1 | 5/2018 | Imagawa et al. | |
| 2019/0064662 A1* | 2/2019 | Liu | G03F 7/0236 |

FOREIGN PATENT DOCUMENTS

| | | |
|---|---|---|
| JP | 2004-197005 A | 7/2004 |
| JP | 2007-145994 A | 6/2007 |
| JP | 2008208324 A | 9/2008 |
| JP | 2009-74024 A | 4/2009 |
| JP | 6098112 B2 | 3/2017 |
| KR | 10-2015-0053826 A | 5/2015 |
| KR | 10-1608961 B1 | 4/2016 |
| KR | 10-2016-0102961 A | 8/2016 |
| KR | 10-2016-0114144 A | 10/2016 |
| KR | 10-2016-0125450 A | 10/2016 |
| KR | 10-2018-0018482 A | 2/2018 |
| WO | 01/73482 A1 | 10/2001 |
| WO | 2007/052566 A1 | 5/2007 |
| WO | 2008/136401 A1 | 11/2008 |

* cited by examiner

*Primary Examiner* — Shane Fang
(74) *Attorney, Agent, or Firm* — BRYAN CAVE LEIGHTON PAISNER LLP

(57) ABSTRACT

A curable composition and an optical element including a cured product thereof. The curable composition includes an episulfide compound and an aromatic heterocyclic compound.

8 Claims, No Drawings

CURABLE COMPOSITION AND OPTICAL ELEMENT COMPRISING CURED PRODUCT THEREOF

CROSS-REFERENCE TO RELATED APPLICATIONS

This application is a U.S. national stage of international Application No. PCT/KR2019/014923, filed Nov. 5, 2019, which claims the benefit of priority from Korean Patent Application No. KR 10-2018-013933, filed Nov. 13, 2018, the contents of which are incorporated herein in their entirety as if fully set forth herein.

TECHNICAL FIELD

The present disclosure relates to a curable composition and an optical element comprising a cured product thereof, and more particularly, to a curable composition comprising an episulfide compound and an aromatic heterocyclic compound represented by Chemical Formula 1, and an optical element comprising a cured product thereof.

BACKGROUND

With a development of portable electronic devices, such as smart phones and notebooks, display device-related technologies are also being developed. A protective film or a substrate for protecting a display element, a polarizing plate and the like is attached to these display devices.

Generally, such a substrate for protecting a display element often has a substrate film and various functional layers formed on the substrate film. The substrate not only serves to protect the display device from external impacts, but also serves to prevent defects and inconsistencies such as rainbow phenomenon, blue light phenomenon, glare, occurrence of scratches, pollution caused by pollutants, and fingerprint smearing phenomenon that can occur while using the display.

Therefore, such a substrate for protecting a display element is often made of materials capable of realizing high strength and hardness in addition to excellent optical properties, such as transmittance, high refractive index, and transparency. In the past, glass materials such as glass or tempered glass, and plastic-based materials such as PET and TAC were often used. Natural glass, tempered glass, and the like can have remarkably high hardness, and thus, excellent scratch-prevention properties, and also have a diverse range of refractive indices, but such materials also have relatively low strength. Thus, a larger thickness is needed to achieve a certain strength or higher. In addition, there is a problem that such materials are denser and heavier than plastic.

The plastic element is very light weight compared to a glass lens, has relatively high strength, and various colors can be implemented in the plastic, but it is difficult to achieve a high refractive index compared to glass.

Therefore, studies are needed to develop new materials to replace a glass or plastic element used in conventional display substrates.

SUMMARY

It is an object of the present disclosure to provide an optical element capable of realizing various colors and realizing a high refractive index while being lighter in weight and having superior strength and hardness compared to glass or tempered glass used in conventional display substrates.

DETAILED DESCRIPTION

Provided herein is a curable composition comprising:
an episulfide compound represented by Chemical Formula 1; and
a first aromatic heterocyclic compound represented by Chemical Formula 2.

[Chemical Formula 1]

In Chemical Formula 1:
n is an integer of 0 to 4, m is an integer of 0 to 6;
R1 and R2 are each independently hydrogen, or an alkyl group having 1 to 10 carbon atoms; and
R3 and R4 are each independently a single bond or an alkylene group having 1 to 10 carbon atoms.

[Chemical Formula 2]

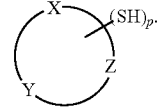

In Chemical Formula 2:
—SH is a thiol substituent connected to a carbon atom of an aromatic hetero ring,
p is 2 or 3,
the number of ring atoms in the aromatic hetero ring is 6,
X, Y, and Z are each independently a carbon (C) or nitrogen (N) atom, at least one of which is a nitrogen (N) atom, and
the remaining atoms of the aromatic hetero ring are carbon (C) atoms.

The curable composition may contain about 1 to about 30 parts by weight of the first aromatic heterocyclic compound based on 100 parts by weight of the episulfide compound.

According to one exemplary embodiment of the present disclosure, in Chemical Formula 1, n may be 0 or 1, and independently, m may also be 0 or 1.

According to another exemplary embodiment of the present disclosure, in Chemical Formula 1, R3 and R4 may be each independently a single bond, methylene, ethylene, propylene, isopropylene, butylene, or isobutylene.

Further, the compound represented by Chemical Formula 2 may be, specifically, a compound represented by Chemical Formula 2-1:

[Chemical Formula 2-1]

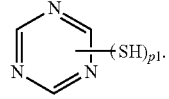

In Chemical Formula 2-1:
—SH is a thiol substituent connected to the carbon atom of the aromatic hetero group, and
p1 is 2 or 3.

The curable composition may further include a second aromatic heterocyclic compound represented by Chemical Formula 3:

[Chemical Formula 3]

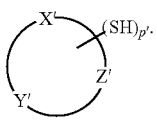

In Chemical Formula 3:
—SH is a thiol substituent connected to the carbon atom of the aromatic hetero group,
p' is 2 or 3,
the number of atoms in the aromatic hetero ring is 5,
X', Y', and Z' are each independently a carbon (C), nitrogen (N), or sulfur (S) atom, at least one of which is a sulfur (S) atom, and
the remaining atoms of the aromatic hetero ring are carbon (C) atoms.

The curable composition may contain about 1 to about 30 parts by weight of the second aromatic heterocyclic compound based on 100 parts by weight of the episulfide compound.

Also provided herein is an optical element comprising a cured product of:
an episulfide compound represented by Chemical Formula 1; and
a first aromatic heterocyclic compound represented by Chemical Formula 2:

[Chemical Formula 1]

In Chemical Formula 1:
n is an integer of 0 to 4, and m is an integer of 0 to 6;
R1 and R2 are each independently hydrogen, or an alkyl group having 1 to 10 carbon atoms; and
R3 and R4 are each independently a single bond or an alkylene group having 1 to 10 carbon atoms.

[Chemical Formula 2]

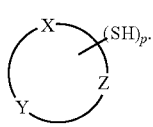

In Chemical Formula 2:
—SH is a thiol substituent connected to a carbon atom of an aromatic hetero ring,
p is 2 or 3,
the number of ring atoms in the aromatic hetero ring is 6,
X, Y, and Z are each independently a carbon (C) or nitrogen (N) atom, at least one of which is a nitrogen (N) atom, and
the remaining atoms of the aromatic hetero ring are carbon (C) atoms.

The cured product included in the optical element may contain about 1 to about 30 parts by weight of the first aromatic heterocyclic compound based on 100 parts by weight of the episulfide compound.

Further, the optical element may also include a cured product of: the episulfide compound, the first aromatic heterocyclic compound, and a second aromatic heterocyclic compound represented by Chemical Formula 3:

[Chemical Formula 3]

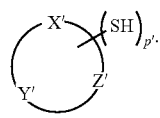

In Chemical Formula 3:
—SH is a thiol substituent connected to a carbon atom of an aromatic hetero ring,
P' is 2 or 3,
the number of ring atoms in the aromatic hetero ring is 5,
X', Y' and Z' are each independently a carbon (C), nitrogen (N), or sulfur (S) atom, at least one of which is a sulfur (S) atom, and
the remaining atoms of the aromatic hetero ring are carbon (C) atoms.

According to one exemplary embodiment of the present disclosure, the optical element may include a cured product having a sulfur (S) atom content of about 50 wt % or more, preferably about 50 to about 70 wt %, more preferably about 52 to about 60 wt %.

Based on the above-described characteristics, the optical element may have a refractive index of about 1.650 or more, preferably about 1.650 to about 1.800, or about 1.700 to about 1.800, or about 1.700 to about 1.750.

The optical element may have a very high transmittance, i.e., the transmittance measured according to JIS K 7361 when the thickness is 1 mm, more specifically, the transmittance value measured according to JIS K 7361 when the thickness of the above-mentioned cured product is 1 mm, may be about 80% or more, preferably about 80% to about 99%, or about 85% to about 90%.

According to another exemplary embodiment of the present disclosure, the optical element may have very low haze value, i.e., the haze measured according to JIS K 7136 when the thickness is 1 mm, more specifically, the haze value measured according to JIS K 7136 when the thickness of the above-mentioned cured product is 1 mm, may be about 1% or less, preferably about 0.01 to about 1%, or about 0.01 to about 0.5%.

Meanwhile, according to another exemplary aspect of the present disclosure, a display device including the above-mentioned optical element can be provided.

The optical element according to an exemplary aspect of the present disclosure is lighter in weight than glass or tempered glass while having high refraction characteristics comparable to glass, and has excellent optical properties as described above, in addition to mechanical properties such as strength and hardness, and thus, can be used as a substitute for glass substrate in various types of display devices.

As used herein, terms such as first, second, and the like may be used to describe various components, and the terms are used only to discriminate one component from another component.

Further, the terms used herein are used only to describe exemplary embodiments, and are not intended to limit the present disclosure.

A singular expression includes a plural expression unless they have definitely opposite meanings in the context.

The terms "comprise", "include", and "have" as used herein are tended to designate the presence of stated features, numbers, steps, constitutional elements, or combinations thereof, but it should be understood that they do not preclude the existence or addition of one or more other features, numbers, steps, constitutional elements, or combinations thereof.

Further, in the present disclosure, in case a layer or an element is mentioned to be formed "on" or "above" another layer or element, it means that the layer or element is directly formed on the other layer or element, or it means that another layer or element may be additionally formed between layers or on a subject or substrate.

Since a variety of modifications may be made to the present disclosure and there may be various forms of the present disclosure, specific examples are illustrated and will be described in detail below. However, it should be understood that this is not intended to limit the present disclosure to particular forms disclosed herein, and the invention covers all modifications, equivalents, or alternatives failing within the spirit and technical scope of the present disclosure.

According to one exemplary aspect of the present disclosure, there is provided an optical element comprising a cured product of:

an episulfide compound represented by Chemical Formula 1; and a first aromatic heterocyclic compound represented by Chemical Formula 2.

[Chemical Formula 1]

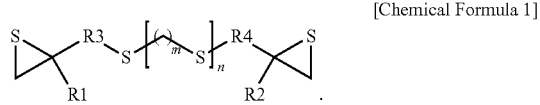

In Chemical Formula 1,
n is an integer of 0 to 4, m is an integer of 0 to 6;
R1 and R2 are each independently hydrogen, or an alkyl group having 1 to 10 carbon atoms; and
R3 and R4 are each independently a single bond or an alkylene group having 1 to 10 carbon atoms.

[Chemical Formula 2]

In Chemical Formula 2:
—SH is a thiol substituent connected to a carbon atom of an aromatic hetero ring,
p is 2 or 3,
the number of ring atoms in the aromatic hetero ring is 6,
X, Y, and Z are each independently a carbon (C) or nitrogen (N) atom, at least one of which is nitrogen (N) atom, and
the remaining atoms of the aromatic hetero ring are carbon (C) atoms.

The present inventors have found that, when a composition including an episulfide compound and a cyclic polythiol compound is polymerized and cured, it is possible to provide an optical element that has excellent mechanical and optical properties while exhibiting high refraction characteristics, and thus, can replace glass or plastic elements used for conventional substrates for displays, etc. The present disclosure has been completed on the basis of such findings.

(Episulfide Compound)

The episulfide compound used in the curable composition of the present disclosure has the structure of Chemical Formula 1:

[Chemical Formula 1]

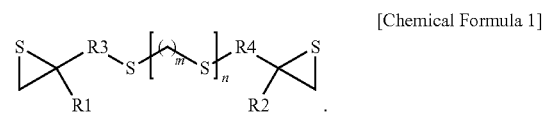

In Chemical Formula 1:
n is an integer of 0 to 4, and m is an integer of 0 to 6;
R1 and R2 are each independently hydrogen, or an alkyl group having 1 to 10 carbon atoms; and
R3 and R4 are each independently a single bond or an alkylene group having 1 to 10 carbon atoms.

Such episulfide compounds have an aliphatic chain type skeleton in which episulfide groups are connected to both ends of the molecule, and a thioether type repeating unit in which an alkylene group is connected by sulfur (S) atoms within the aliphatic chain.

The episulfide compound can be cured by ring-opening polymerization, but the alkylene sulfide group formed by ring-opening polymerization of an episulfide group can contribute to high refraction characteristics of the cured product.

In addition, the episulfide compound may contain a high content of sulfur (S) atoms having a large atomic refraction in the molecule due to the specific chemical structure described above, and due to the high content of sulfur atom, the refractive index of the cured product can be further increased.

According to one exemplary embodiment of the present disclosure, in Chemical Formula 1, n may be 0 or 1, and independently, m may also be 0 or 1.

In Chemical Formula 1, n is the number of thioether repeating units in which an alkylene group is connected by a sulfur (S) atom, and when n is too large, the chain length of the molecule becomes longer. Thus, at the time of curing, the glass transition temperature of the cured product is low, which may reduce the heat resistance of the cured product.

Further, in Chemical Formula 1, m relates to the carbon number of the alkylene group contained in the thioether repeating unit, and when m is too large, the length of the carbon chain in the molecule becomes longer. Thus, at the time of curing, the glass transition temperature of the cured product becomes low, which may cause reduce the heat resistance of the cured product. In addition, the relative sulfur content is lowered, which may lower the refractive index of the cured product.

Further, in Chemical Formula 1, R3 and R4 may each independently be a single bond, methylene, ethylene, propylene, isopropylene, butylene, or isobutylene, but the present disclosure is not limited thereto.

Further, the compound of Chemical Formula 1 may be used alone or a combination of two or more compounds may be used.

Specific examples of the episulfide compound may include bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane, 1,4-bis(β-epithiopropylthio)butane, and the like, but the present disclosure is not necessarily limited thereto.

(Polythiol Compound)

In addition, the first aromatic heterocyclic compound used in the curable composition of the present disclosure is represented by Chemical Formula 2:

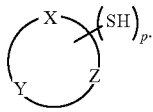

[Chemical Formula 2]

In Chemical Formula 2:
—SH is a thiol substituent connected to a carbon atom of an aromatic hetero ring,
p is 2 or 3,
the number of ring atoms in the aromatic hetero ring is 6,
X, Y, and Z are each independently a carbon (C) or nitrogen (N) atom, at least one of which is a nitrogen (N) atom, and
the remaining atoms of the aromatic hetero ring are carbon (C) atoms.

That is, the above-mentioned first aromatic heterocyclic compound can be a polythiol compound in which two or more thio groups (SH) are connected to a six-membered aromatic ring containing a hetero atom.

Such a polythiol compound may react with the episulfide group of the above-describes episulfide compound during the ring-opening polymerization reaction of the episulfide group to form a disulfide bond or the like, thereby producing a cured product, which contains a high content of sulfur (S) atoms having large atomic refraction in the molecule, thereby making it possible to further increase the refractive index of the cured product.

The compound represented by Chemical Formula 2 may be, specifically, a compound represented by Chemical Formula 2-1:

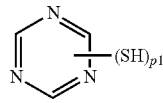

[Chemical Formula 2-1]

In Chemical Formula 2-1,
—SH is a thiol substituent connected to the carbon atom of the aromatic hetero group, and
p1 is 2 or 3.

The aromatic hetero compound has a high sulfur content and an aromatic structure and thus, can exhibit a refractive index. It has two or more thiol substituents, and thus, when used as a curing agent together with an episulfide compound, the glass transition temperature of the cured product can be increased, thereby increasing the physical strength of the cured product.

According to one exemplary embodiment of the present disclosure, the curable composition may contain the first aromatic heterocyclic compound in an amount of about 1 to about 30 parts by weight, preferably, about 1 to about 25 parts by weight, or about 5 to about 25 parts by weight, based on 100 parts by weight of the episulfide compound.

When the curable composition is composed of only the episulfide compound and the first aromatic heterocyclic compound, the relative ratio of the episulfide compound: the first aromatic heterocyclic compound may be about 99:1 to about 70:30.

When the content of the first aromatic heterocyclic compound is too low, the refractive index may be lowered. When the content of the first aromatic heterocyclic compound is too high, the relative content of the episulfide compound may be lowered, the transparency of the optical element may deteriorate, and mechanical properties such as hardness and strength may also deteriorate.

The curable composition may further include a second aromatic heterocyclic compound represented by Chemical Formula 3:

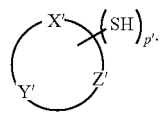

[Chemical Formula 3]

In Chemical Formula 3,
—SH is a thiol substituent connected to a carbon atom of an aromatic hetero ring,
P' is 2 or 3,
the number of ring atoms in the aromatic hetero ring is 5,
X', Y' and Z' are each independently a carbon (C), nitrogen (N) or sulfur (S) atom, at least one of which is a sulfur (S) atom, and
the remaining atoms of the aromatic hetero ring are carbon (C) atoms.

That is, the second aromatic heterocyclic compound can be a polythiol compound in which two or more thio groups (SH) are connected to a five-membered aromatic ring containing a hetero atom.

Such a polythiol compound may also react with the episulfide group of the above-described episulfide compound during the ring-opening polymerization reaction of the episulfide group to form a disulfide bond or the like. Thereby, a cured product can be produced, and the rigidity of the cured product can be adjusted to impart flexibility.

The curable composition may contain from about 1 to about 30 parts by weight of the second aromatic heterocyclic compound based on 100 parts by weight of the episulfide compound.

That is, the curable composition may contain about 1 to about 30 parts by weight of the first aromatic heterocyclic compound, based on 100 parts by weight of the episulfide compound, and it may additionally include about 1 to about 30 parts by weight of the second aromatic heterocyclic compound.

When the content of the second aromatic heterocyclic compound is too low, the cured product may be easily broken, and when the content of the second aromatic heterocyclic compound is too high, the refractive index may be lowered.

The curable composition may further include a polyisocyanate compound to improve the strength of the cured product.

The polyisocyanate compound may be included in an amount of about 1 to about 25 wt %, preferably about 5 to about 20 wt %, based on the total weight of the composition, including the episulfide compound and the aromatic heterocyclic compound.

When the content of the polyisocyanate compound is too low, the strength of the cured product may not be sufficiently improved, and when the content is too high, the optical properties may deteriorate.

Specific examples of the polyisocyanate compound include ethylene diisocyanate, tetramethylene diisocyanate, hexamethylene diisocyanate, trimethylhexamethylene diisocyanate, cyclohexanediisocyanate, 1,3-bis(isocyanatemethyl)cyclohexane, 1,4-bis(isocyanatemethyl)cyclohexane, isophorone diisocyanate, 2,6-bis(isocyanate methyl)decahydronaphthalene, lysine triisocyanate, tolylene diisocyanate, o-tolidine diisocyanate, diphenylmethane diisocyanate, diphenyl ether diisocyanate, 3-(2'-isocyanatecyclohexyl) propyl isocyanate, isopropylidenebis(cyclohexyl isocyanate), 2,2'-bis(4-isocyanatephenyl)propane, triphenylmethanetriisocyanate, bis(diisocyanatetolyl)phenylmethane, 4,4', 4"-triisocyanate-2,5-dimethoxyphenylamine, 3,3'-dimethoxybenzidine-4,4'-diisocyanate, 1,3-phenylenediisocyanate, 1,4-phenylenediisocyanate, 4,4'-diisocyanate biphenyl, 4,4'-diisocyanate-3,3'-dimethylbiphenyl, dicyclohexylmethane-4,4'-diisocyanate, 1,1'-methylenebis(4-isocyanatebenzene), 1,1'-methylenebis(3-methyl-4-isocyanatebenzene), m-xylylenediisocyanate, p-xylylenediisocyanate, m-tetramethylxylylenediisocyanate, p-tetramethylxylylenediisocyanate, 1,3-bis(2-isocyanate-2-propyl)benzene, 2,6-bis(isocyanate methyl)naphthalene, 1,5-naphthalenediisocyanate, bis(isocyanatemethyl)tetrahydrodicyclopentadiene, bis(isocyanatemethyl)dicyclopentadiene, bis(isocyanatemethyl)tetrahydrothiophene, bis(isocyanatemethyl)norbornene, bis(isocyanatemethyl)adamantane, thiodiethyldiisocyanate, thiodipropyldiisocyanate, thiodihexyldiisocyanate, bis[(4-isocyanatemethyl)lphenyl]sulfide, 2,5-diisocyanate-1,4-dithiane, 2,5-diisocyanate methyl-1,4-dithiane, 2,5-diisocyanatemethylthiophene, dithiodiethyldiisocyanate, dithiodipropyldiisocyanate, and the like, but the present disclosure is not necessarily limited thereto.

According to one exemplary embodiment of the present disclosure, the curable composition may further include a polymerization catalyst to accelerate polymerization and curing of the above-described compound.

Examples of the polymerization catalyst include an amine, an ammonium salt, a phosphate salt, or the like, and specific examples thereof include tertiary amines, such as N,N-dimethylcyclohexylamine, and ammonium salts, such as tetra-n-butylammonium salt and triethylbenzylammonium salt.

The content of the polymerization catalyst is about 0.001 to about 10 wt %, preferably 0.001 wt % to about 5 wt %, or about 0.01wt % to about 1 wt %, based on the total weight of the composition, including the episulfide compound and the aromatic heterocyclic compound.

In addition, the curable composition may further include other additives such as ultraviolet absorbers, bluing agents, and pigments that are used for imparting specific functions to a display substrate in the technical field to which the present disclosure pertains.

Meanwhile, according to one exemplary aspect of the present disclosure, there is provided an optical element comprising a cured product of: an episulfide compound represented by Chemical Formula 1; and a first aromatic heterocyclic compound represented by Chemical Formula 2:

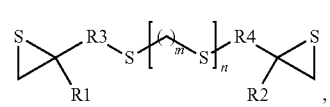

[Chemical Formula 1]

in Chemical Formula 1:
n is an integer of 0 to 4, m is an integer of 0 to 6;
R1 and R2 are each independently hydrogen, or an alkyl group having 1 to 10 carbon atoms; and
R3 and R4 are each independently a single bond or an alkylene group having 1 to 10 carbon atoms;

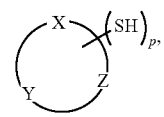

[Chemical Formula 2]

in Chemical Formula 2:
—SH is a thiol substituent connected to a carbon atom of an aromatic hetero ring,
p is 2 or 3,
the number of ring atoms in the aromatic hetero ring is 6,
X, Y, and Z are each independently a carbon (C) or nitrogen (N) atom, at least one of which is a nitrogen (N) atom, and
the remaining atoms of the aromatic hetero ring are carbon (C) atoms.

The cured product included in the optical element may contain about 1 to about 30 parts by weight of the first aromatic heterocyclic compound based on 100 parts by weight of the episulfide compound.

Further, the optical element may also include a cured product of: the episulfide compound, the first aromatic heterocyclic compound, and a second aromatic heterocyclic compound represented by Chemical Formula 3:

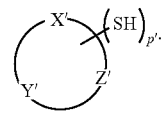

[Chemical Formula 3]

In Chemical Formula 3:
—SH is a thiol substituent connected to a carbon atom of an aromatic hetero ring,
P' is 2 or 3,
the number of ring atoms in the aromatic hetero ring is 5,
X', Y' and Z' are each independently a carbon (C), nitrogen (N) or sulfur (S) atom, at least one of which is a sulfur (S) atom, and
the remaining atoms of the aromatic hetero ring are carbon (C) atoms.

In addition, the episulfide compound, the first aromatic heterocyclic compound, the second aromatic heterocyclic compound, the additives and the like are substituted for those described above with respect to the curable composition.

Such an optical element can be produced by a method of curing the curable composition described above.

Specifically, a uniform composition containing the above-mentioned curable composition and various additives is prepared, and the composition is injected into a mold made of components such as glass, metal, or polymer resin and a mold combining resinous gaskets, and is heated and cured.

To easily remove the molded resin after molding, the mold may be previously subjected to a mold release treatment, or a mold release agent may be added to the above-mentioned composition before use.

The polymerization temperature may vary depending on the type and content of the compounds used, but in general, it can proceed at about −20° C. to about 150° C., preferably, about 50° C. to about 120° C., more preferably about 60° C. to about 100° C., and the polymerization time can be from about 0.1 to about 72 hours, preferably from about 0.5 to about 24 hours.

The polymerization reaction may be performed by combining a process of maintaining the above-described predetermined polymerization temperature for a predetermined time, a temperature raising process, and a temperature reducing process, and the like. After the completion of the reaction, post-treatment is performed for about 10 minutes to about 3 hours at a temperature condition of about 50° C. to about 150° C., preferably about 80° C. to about 120° C., thereby preventing deformation.

The optical element released after the polymerization may be provided with various functionalities through processes such as dyeing, coating, and the like.

According to one exemplary embodiment of the present disclosure, the optical element may include a cured product having a sulfur (S) atom content of about 50 wt % or more, preferably about 50 to about 70 wt %, more preferably about 52 to about 60 wt %.

When the content of sulfur atoms is too low, the refractive index may be lowered, and when the content of sulfur atom is too high, the YI (yellow Index) of the cured product may increase.

Due to the above-described characteristics, the optical element may have a refractive index of about 1.650 or more, preferably about 1.650 to about 1.800, or about 1.700 to about 1.800, or about 1.700 to about 1.750.

The optical element can have very high transmittance, i.e., the transmittance measured according to JIS K 7361 when the thickness is 1 mm, more specifically, the transmittance value measured according to JIS K 7361 when the thickness of the above-mentioned cured product is 1 mm, may be about 80% or more, preferably about 80 to about 99%, or about 85 to about 90%.

According to another exemplary embodiment of the present disclosure, the optical element can have very low haze value, i.e., the haze measured according to JIS K 7136 when the thickness is 1 mm, more specifically, the haze value measured according to JIS K 7136 when the thickness of the cured product is 1 mm, may be about 1% or less, preferably about 0.01 to about 1%, or about 0.01 to about 0.5%.

Meanwhile, another exemplary aspect of the present disclosure is directed to a display device including the above-mentioned optical element.

The optical element according to an exemplary aspect of the present disclosure is lighter in weight than glass or tempered glass while having high refraction characteristics comparable to glass, and has excellent optical properties as described above in addition to mechanical properties such as strength and hardness, and thus, can be used as a substitute for glass substrate in various types of display devices.

The optical element of the present disclosure is lighter in weight while having high refraction characteristics, and has excellent mechanical properties and optical properties, and thus, can be used as a substitute for glass substrate in various types of display devices.

Hereinafter, the operation and effect of the invention will be described in more detail by way of examples. However, these examples are merely presented for illustrative purposes only, and the scope of the invention is not determined thereby.

EXAMPLE

The episulfide compound, the first aromatic heterocyclic compound, and the second aromatic heterocyclic compound used are as follows.

Episulfide Compound:
Bis(β-epithiopropyl)sulfide, manufacturer: KOC Solution, product name:
KT-70A

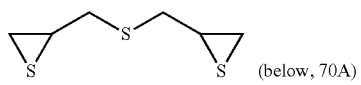

(below, 70A)

Bis(β-epithiopropyl)disulfide, manufacturer: KOC Solution, product name: KT-74A

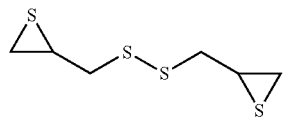

(below, 74A)

Disulfide Compound of Comparative Example:
2,2'-thiodiethanethiol

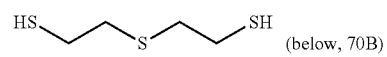

(below, 70B)

Isocyanate Compound of Comparative Example:
5-isocyanato-1-(isocyanatomethyl)-1,3,3-trimethylcyclohexane

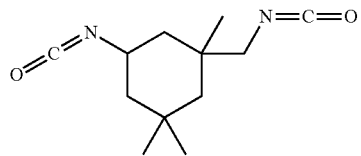

(below, 70C)

First Aromatic Heterocyclic Compound
1,3,5-triazine-2,4,7-trithiol, manufacturer: Aldrich, product name: Trithiocyanuric acid

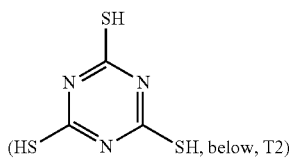

(below, T2)

Second Aromatic Heterocyclic Compound 1,3,4-triazine-2,5-dithiol, manufacturer: Aldrich, product name: 1,3,4-Thiadiazole-2,5-dithiol

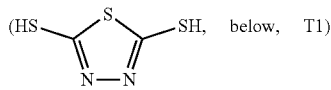

Example 1

80.00 g of the episulfide compound 70A and 20.00 g of the first aromatic heterocyclic compound were vigorously mixed at 20° C. for 1 hour, and then the mixture was filtered using a glass filter with an average pore size of 1 μm, and filtered once again using a PVDF filter having an average pore size of 0.45 μm.

Then, 0.5 g of N,N-dicyclohexylmethylamine was added as a curing catalyst, and mixed for 5 minutes to prepare a mixed solution.

A 1 mm thick slide glass was placed on both sides of LCD glass with a size of 10 cm in length and width, and about 5 g of the above-mentioned mixed solution was applied to the center of the LCD glass, and then covered with another LCD glass to prepare a mold.

This was placed in an oven, and the curing reaction proceeded at about 60° C. for about 10 hours and at about 90° C. for about 4 hours.

After taking out from the oven, the LCD glass was removed to obtain a flat plastic specimen.

The thickness of the plastic specimen was about 1 mm. The thickness was measured using Mitutoyo Thickness Gauge (Model: ID-C112XBS).

Examples 2 to 5

The procedure was performed in the same manner as in Example 1, except that the episulfide compound, the first aromatic heterocyclic compound, and the second aromatic heterocyclic compound were in different contents.

The compositions used in Examples 1 to 5 are summarized in Table 1 below.

TABLE 1

| | Compound used | Episulfide compound (content, g) | First aromatic heterocyclic compound (content, g) | Second aromatic heterocyclic compound (content, g) |
|---|---|---|---|---|
| Example 1 | 70A + T2 | 70A (80 g) | T2 (20 g) | — |
| Example 2 | 70A + T1 + T2 | 70A (90 g) | T2 (8 g) | T1 (2 g) |
| Example 3 | 74A + T2 | 74A (80 g) | T2 (20 g) | — |
| Example 4 | 74A + T1 + T2 | 74A (90 g) | T2 (9 g) | T1 (1 g) |
| Example 5 | 70A + 74A + T1 + T2 | 70A (45 g) 74A (45 g) | T2 (5 g) | T1 (5 g) |
| Comparative Example 1 | 70A + 70B + 70C | 70A (88.5 g) 70B (6.5 g) 70C (5.0 g) | — | — |
| Comparative Example 2 | 70A + T1 | 70A (80 g) | — | T1 (20 g) |
| Comparative Example 3 | 74A + T1 | 74A (85 g) | — | T1 (15g) |

Measurement of Physical Property
Measurement of haze and transmittance

For the specimen, haze (JIS K 7136) and transmittance (JIS K 7361) were measured using NDH-5000 from Nippon Denshoku Industries Co. Ltd. in the thickness direction of the cured product cured to a reference thickness of 1 mm.

Measurement of Refractive Index

For the specimen, the refractive index value was measured using spectroscopic ellipsometry from Ellipso Technology.

Measurement of Sulfur Atom Content

For the specimen, the content of sulfur atoms was measured using an elemental analysis method.

The measured results are summarized in Table 2 below.

TABLE 2

| | Transmittance (%) | Haze (%) | Refractive index | Sulfur atom content (wt %) |
|---|---|---|---|---|
| Example 1 | 86.7 | 0.3 | 1.732 | 53.96 |
| Example 2 | 86.8 | 0.4 | 1.741 | 55.95 |
| Example 3 | 86.7 | 0.3 | 1.751 | 59.61 |
| Example 4 | 85.9 | 0.4 | 1.748 | 60.40 |
| Example 5 | 86.7 | 0.3 | 1.766 | 61.26 |
| Comparative Example 1 | 88.0 | 0.3 | 1.711 | 51.78 |
| Comparative Example 2 | 86.0 | 0.4 | 1.751 | 55.95 |
| Comparative Example 3 | 5.2 | 0.4 | 1.783 | 61.41 |

Referring to Table 2, it can be seen that the specimen including the cured product according to Examples of the present disclosure has a very high transmittance and a low haze value, but a relatively high refractive index.

In the case of Comparative Example 1, it exhibited characteristics of a very low transmittance and a low haze, but it was found that the refractive index value was slightly lower than that of Examples of the present disclosure. In the case of Comparative Example 3, the transmittance is very low and thus, it was difficult to use as an optical element. In the case of Comparative Examples 2 and 3, when preparing the curable composition, the viscosity is slightly higher compared to Examples of the present disclosure, and thus, it is difficult to manufacture it as a plastic resin specimen or process it into a lens.

What is claimed is:

1. An optical element comprising a cured product of:
an episulfide compound represented by Chemical Formula 1,

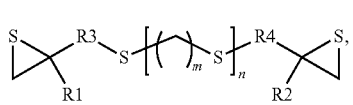

[Chemical Formula 1]

wherein in Chemical Formula 1,
n is an integer of 0 to 4, m is an integer of 0 to 6;
R1 and R2 are each independently hydrogen, or an alkyl group having 1 to 10 carbon atoms; and
R3 and R4 are each independently a single bond or an alkylene group having 1 to 10 carbon atoms; and
a first aromatic heterocyclic compound represented by Chemical Formula 2-1:

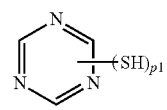

[Chemical Formula 2-1]

wherein in Chemical Formula 2-1,

—SH is a thiol substituent connected to the carbon atom of the aromatic hetero group, and is 2 or 3, and wherein the cured product has a sulfur atom content of about 50 wt% to about 70 wt %.

2. The optical element of claim 1, wherein the cured product comprises 1 to 30 parts by weight of the first aromatic heterocyclic compound based on 100 parts by weight of the episulfide compound.

3. The optical element of claim 1, comprising a cured product of: the episulfide compound represented by Chemical Formula 1, the first aromatic heterocyclic compound represented by Chemical Formula 2, and a second aromatic heterocyclic compound represented by Chemical Formula 3,

[Chemical Formula 3]

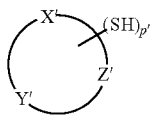

wherein in Chemical Formula 3,

—SH is a thiol substituent connected to a carbon atom of an aromatic hetero ring, P' is 2 or 3, the number of ring atoms in the aromatic hetero ring is 5, X', Y' and Z' are each independently a carbon (C), nitrogen (N) or sulfur (S) atom, and at least one of X', Y' and Z' is a sulfur (S) atom, and the remaining atoms of the aromatic hetero ring are carbon (C) atoms.

4. The optical element of claim 1, wherein a refractive index is of the optical element 1.650 or more.

5. The optical element of claim 1, wherein a transmittance of the optical element measured according to JIS K 7361 when the thickness of the cured product is 1 mm is 80% or more.

6. The optical element of claim 1, wherein a haze value of the optical element measured according to JIS K 7136 when the thickness of the cured product is 1 mm is 1% or less.

7. A display device comprising the optical element according to claim 1.

8. The optical element of claim 1, wherein the cured product has a sulfur atom content of about 50 wt % to about 62 wt %.

* * * * *